(12) United States Patent
Waterstredt et al.

(10) Patent No.: US 10,102,954 B2
(45) Date of Patent: Oct. 16, 2018

(54) SOLENOID ACTUATOR ASSEMBLY WITH PRESS FIT HOUSING ASSEMBLY

(71) Applicant: BORGWARNER INC., Auburn Hills, MI (US)

(72) Inventors: Jeffrey J. Waterstredt, Royal Oak, MI (US); David C. Mills, Lake Orion, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 15/852,218

(22) Filed: Dec. 22, 2017

(65) Prior Publication Data

US 2018/0122545 A1 May 3, 2018

Related U.S. Application Data

(63) Continuation of application No. 15/319,277, filed as application No. PCT/US2015/035816 on Jun. 15, 2015, now Pat. No. 9,887,031.

(60) Provisional application No. 62/013,203, filed on Jun. 17, 2014.

(51) Int. Cl.
| | |
|---|---|
| *H01F 7/127* | (2006.01) |
| *H01F 7/16* | (2006.01) |
| *H01H 71/02* | (2006.01) |
| *H01H 73/06* | (2006.01) |

(52) U.S. Cl.
CPC .......... *H01F 7/127* (2013.01); *H01F 7/1607* (2013.01); *H01H 71/02* (2013.01); *H01H 73/06* (2013.01)

(58) Field of Classification Search
CPC ....... H01F 7/1607; H01F 7/127; H01H 71/02; H01H 71/326; H01H 73/06
See application file for complete search history.

(56) References Cited

U.S. PATENT DOCUMENTS

| | | | |
|---|---|---|---|
| 6,144,275 A | 11/2000 | Hirata et al. | |
| 8,427,263 B2 * | 4/2013 | Hoppe | H01F 7/081 335/255 |
| 2008/0079521 A1 | 4/2008 | Maerky et al. | |
| 2010/0294637 A1 | 11/2010 | Silva et al. | |
| 2014/0014863 A1 | 1/2014 | Najmolhoda et al. | |
| 2017/0148556 A1 | 5/2017 | Waterstredt et al. | |

FOREIGN PATENT DOCUMENTS

JP 2009085322 A 4/2009

OTHER PUBLICATIONS

International Search Report for Application No. PCT/US2015/035816 dated Aug. 31, 2015, 3 pages.
English language abstract and machine-assisted English translation for JP 2009-085322 extracted from espacenet.com database on Dec. 21, 2016, 22 pages.

* cited by examiner

*Primary Examiner* — Mohamad Musleh
(74) *Attorney, Agent, or Firm* — Howard & Howard Attorneys PLLC

(57) ABSTRACT

A solenoid actuator is provided which has a lower housing having a generally axially extending portion joined to an end cap with a central opening. An upper housing of the solenoid actuator is formed from a flat stock with a main body with radially extending slot separated legs which are plastically deformed into a cylindrical portion for press fit acceptance with an outer diameter of lower housing axially extending portion.

13 Claims, 1 Drawing Sheet

SOLENOID ACTUATOR ASSEMBLY WITH PRESS FIT HOUSING ASSEMBLY

CROSS-REFERENCE TO RELATED APPLICATIONS

This application is a continuation of U.S. patent application Ser. No. 15/319,277 filed on Dec. 15, 2016, which is the National Stage of International Patent Application No. PCT/US2015/035816, filed on Jun. 15, 2015, which claims priority to and all the advantages of U.S. Provisional Patent Application No. 62/013,203, filed on Jun. 17, 2014, the content of which is incorporated herein by reference.

FIELD OF THE INVENTION

The present invention relates to solenoid actuators. More particularly, the present invention relates to solenoid actuators that are utilized in automotive applications.

BACKGROUND OF THE INVENTION

Most solenoid actuators have a ferromagnetic casing which is typically fabricated from low carbon steel. Positioned within the casing is a coil which typically is typically fabricated from a conductive material such as copper. The coil is often wrapped onto a polymeric bobbin. Encircled by the coil is a core. The core typically has one portion referred to as a flux tube and another portion referred to as a shunt. Separating the flux tube from the shunt is a flux choke which in some solenoid actuators is provided by a narrow portion of the core. When the flux choke is provided by a narrow portion of the core, it is desirable that the flux choke be as thin as structurally possible to maximize the performance of the solenoid actuator for a given actuating amperage. Many solenoid actuators have a two part casing. The casing will have a lower housing, which is circular in cross-sectional shape with an axially extending tubular portion joined to an end cap having a central opening. A casing typically also has an upper housing with a mainly circular body with an axially extending cylindrical portion which has a slip fit over an exterior of the lower housing axially extending portion. To join the casing upper and lower housings together to provide for magnetic connection, the cylindrical portion of the upper and lower housings are typically welded together.

It is desirable to provide a solenoid actuator in a method of manufacturing thereof which deletes the requirement for the welding of the upper and lower casings together. There is also a desire to provide a solenoid actuator as aforedescribed providing a core with a flux choke being as thin as structurally possible. It is also desirable to provide solenoid actuator with a casing which lends itself to high volume production manufacturing methods that additionally meets the aforementioned desires. It is further desirable to provide all the desires above with casing requiring minimal cost of production and providing a casing which minimizes weight.

SUMMARY OF THE INVENTION

To make manifest the above noted desires, a revelation of the present invention is brought forth. In a preferred embodiment, the present invention brings forth a solenoid actuator and method of manufacture thereof wherein the solenoid actuator has a casing. The casing includes a lower housing having a generally axially extending portion joined to an end cap with a central opening. The casing has an upper housing formed from a flat stock blank with a main body with radially extending slot separated legs plastically deformed to form a cylindrical portion. The cylindrical portion of the upper housing accepts an outer diameter of the lower housing axially extending portion in a press fit relationship. A coil is positioned within the casing. A core is provided including an integrally joined flux tube and shunt which are axially separated by flux choke. The core is magnetically connected with the casing and encircled by the coil. An armature is slidably mounted within the core. An axial position of the upper housing cylindrical portion with the lower housing axial portion is set by axially capturing the core between the upper housing main body and the lower housing end cap.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
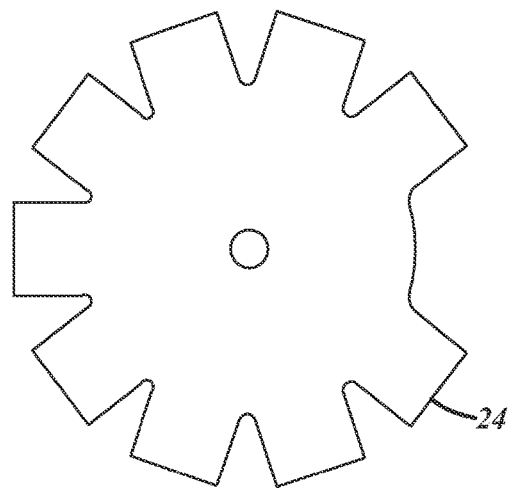
FIG. 1 is a plane view of an upper housing stamp blank of an upper housing of the solenoid actuator according to the present invention.
Figure 2:
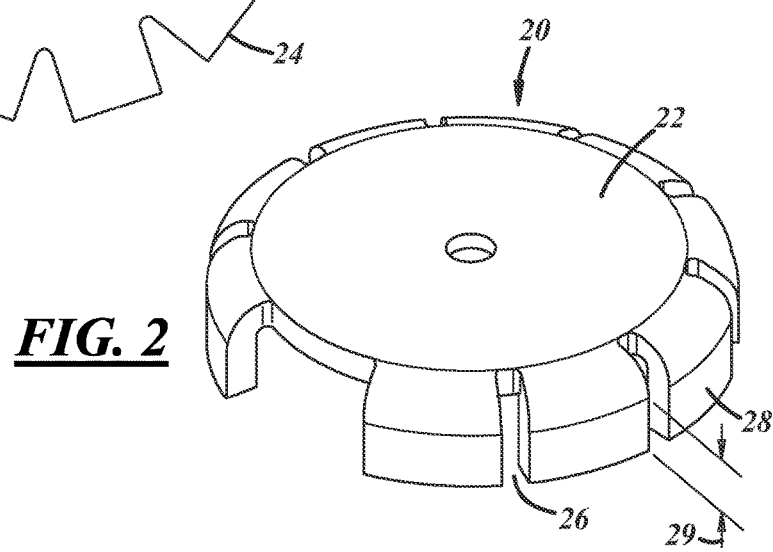
FIG. 2 is a perspective view of an upper housing which has been plastically deformed from a blank shown as in FIG. 1.
Figure 3:
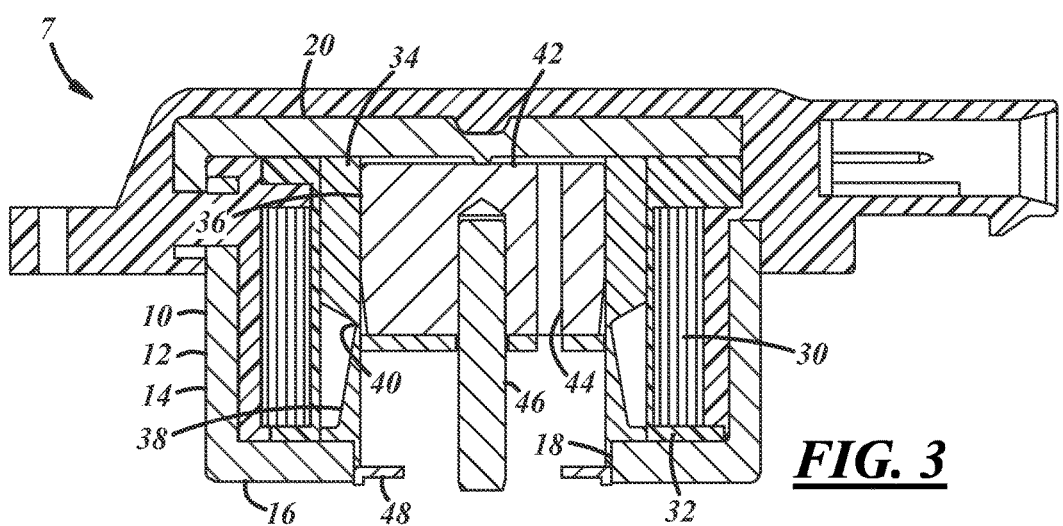
FIG. 3 is a sectional view of a solenoid actuator according to the present invention.

Referring to FIGS. 1, 2, and 3, a solenoid actuator 7 according to the present invention is provided. The solenoid actuator 7 has a casing 10. The casing 10 is typically fabricated from a ferromagnetic material such as low carbon 1006-1020 steel or other suitable alternatives. The casing includes a lower housing 12. The lower housing 12 includes an axially extending portion 14 which is joined to an end cap 16 having a central opening 18. Casing 10 also includes an upper housing 20. The upper housing 20 has a main body 22 with radially extending legs 24 that are separated by slots 26. From an initial form of flat stock, the upper housing is plastically deformed so that the legs 24 form a cylindrical portion 28 for press fit acceptance with an outer diameter of the axially extending portion 14 of the lower housing. The legs have a common axial length 29.

Positioned within the casing 10 is a coil 30. The coil 30 is typically fabricated from a conductive material such as copper. The coil is wrapped onto a polymeric bobbin 32. Encircled by the coil 30 is a core 34. The core 34 has a upper portion commonly referred to as a flux tube 36. The core 34 has another portion referred to as a shunt 38. Separating the flux tube 36 from the shunt 38 is a narrowed portion of the core referred to as the flux choke 40. The flux choke is integrally connected with the flux tube 36 and the shunt 38, and from a performance standpoint it is desirable that it be as thin as structurally possible to maximize the performance of the actuator for a given actuating current. The core 34 is magnetically connected with the casing along its upper flat end by contact with the upper housing 20 and along its lower end by its axial and radial contact with the end cap 16.

Slidably mounted in the core 34 is an armature 42. The armature 42 has an off-center bore 44 to allow a fluid such as hydraulic oil to be on both sides of the armature. Fixedly connected to the armature 42 is a transported member 46. The actuator has a stop 48 to limit travel of the armature 42.

The axial position of the upper housing cylindrical portion 28 with respect to the axially extending portion 14 of the lower housing 12 is set by axially capturing the core 34 between the upper housing main body 22 and the lower housing end cap 16. It is desirable for functional reasons that there be a press fit relationship between the upper housing cylindrical portion 28 and the lower housing axially extending portion 14 for maximum contact for flux transfer between the members. However it is also desirable that the flux choke 40 be as thin as possible for maximum magnetic performance and therefore be able to withstand axial forces transmitted through the core 34 due to the press fitting assembly operation. The shunt 38 not only has bottom interface axial contact with the end cap 16 but it also has radial interface contact with the end cap 16 along the central opening 18.

One of the many advantages of the solenoid actuator of the present invention is that by plastically deforming from flat stock the upper housing with its radially extending legs with slots there between the band stress between the upper housing and the axially extending portion 14 of the lower housing provides the optimum qualities of sufficient band strength to insure high magnetic transfer properties while at the same time not requiring so much axial force in an assembly operation. Higher press fit force mandates that a thicker flux choke 40 be utilized. Typically the flux choke 40 with the slotted upper housing can be at least 10% or 20% thinner than a flux choke 40 utilizing a press fit upper housing without the slotted legs 24 of the current invention. Furthermore, beyond the functional advantages the slotted leg design of the upper housing provides significant cost advantages over upper housings which are simply deep drawn from a circular blank. Additionally, the limited cold working of this slotted upper housing 20 reduces or eliminates a requirement for magnetic heat treatment and the associated cost and distortion of the parts. Additionally, the upper housing 20 can be lighter as compared with a deep draw upper housing.

In assembly a core 34 along with coil 30 and bobbin 34 are placed within the lower housing. The upper housing is then press fit over the lower housing 12. The press fitting operation is completed upon capturing the core 34 between the upper housing main body 22 and the end cap 16. The axial position between the upper 20 and lower 12 housings is set. The actuator assembly is then placed within a mold for injection of a polymeric isolator which also forms a connector body for the electrical connections for the solenoid. The injection pressure must be low enough that there is no distortion of the flux choke 40 or the core 34. The injected material will surround the coil 30 and cover a top of the upper casing 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid actuator comprising:
   a coil defining an electromagnetic circuit;
   an armature moveable by said electromagnetic circuit; and
   a housing formed from a flat stock blank with a main body with radially extending slot separated legs plastically deformed to form a cylindrical portion for engagement with said electromagnetic circuit.

2. The solenoid actuator as described in claim 1, further comprising magnetically permeable components surrounding said coil for carrying magnetic flux from said coil and through said armature, wherein said magnetically permeable components comprise at least one of said housing or a core.

3. The solenoid actuator as described in claim 2, wherein said core comprises an integrally joined flux tube and shunt, said flub tube and shunt being axially separated by a flux choke.

4. The solenoid actuator as described in claim 1, wherein said solenoid actuator is submersible.

5. The solenoid actuator as described in claim 1, wherein said armature has a bore to allow fluid on both sides of said armature.

6. A solenoid actuator comprising:
   a coil configured to generate an electromagnetic field upon activation;
   an armature moveable by said electromagnetic field of said coil;
   a core surrounding said coil for carrying said electromagnetic field around said coil and through said armature; and
   a housing formed from a flat stock blank with a main body with radially extending slot separated legs plastically deformed to form a cylindrical portion for engagement with said core.

7. The solenoid actuator as described in claim 6, wherein said core comprises an integrally joined flux tube and shunt, said flub tube and shunt being axially separated by a flux choke.

8. The solenoid actuator as described in claim 6, wherein said core is magnetically connected with said housing.

9. The solenoid actuator as described in claim 6, wherein said solenoid actuator is submersible.

10. The solenoid actuator as described in claim 6, wherein said armature has a bore to allow fluid on both sides of said armature.

11. A solenoid actuator comprising:
    a coil configured to generate an electromagnetic field upon activation;
    an armature moveable by said electromagnetic field of said coil; and
    a housing formed from a flat stock blank with a main body with radially extending slot separated legs plastically deformed to form a cylindrical portion, said coil positioned within said housing.

12. The solenoid actuator as described in claim 11, wherein said solenoid actuator is submersible.

13. The solenoid actuator as described in claim 11, wherein said armature has a bore to allow fluid on both sides of said armature.

* * * * *